US012714639B2

(12) United States Patent
Yan et al.

(10) Patent No.: US 12,714,639 B2
(45) Date of Patent: Aug. 25, 2026

(54) SEXUAL STIMULATION DEVICE

(71) Applicants: Dongguan Qunan Technology Co., Ltd., Dongguan (CN); Shenzhen Zhonghongtian Technology Co., Ltd., Shenzhen (CN)

(72) Inventors: Bo Yan, Dongguan (CN); Hong Zhang, Shenzhen (CN)

(73) Assignees: Dongguan Qunan Technology Co., Ltd., Dongguan (CN); Shenzhen Zhonghongtian Technology Co, Ltd., Shenzhen (CN)

( * ) Notice: Subject to any disclaimer, the term of this patent is extended or adjusted under 35 U.S.C. 154(b) by 0 days.

(21) Appl. No.: 18/991,729

(22) Filed: Dec. 23, 2024

(65) Prior Publication Data

US 2026/0108419 A1 Apr. 23, 2026

(30) Foreign Application Priority Data

Oct. 22, 2024 (CN) ......................... 202422558681.5

(51) Int. Cl.
*A61H 23/02* (2006.01)
*A61H 19/00* (2006.01)
*A61H 21/00* (2006.01)

(52) U.S. Cl.
CPC ......... *A61H 23/0254* (2013.01); *A61H 19/34* (2013.01); *A61H 19/44* (2013.01); *A61H 21/00* (2013.01)

(58) Field of Classification Search
CPC ........ A61H 19/34; A61H 19/44; A61H 19/00; A61H 19/40; A61H 21/00; A61H 23/0254
See application file for complete search history.

(56) References Cited

U.S. PATENT DOCUMENTS

| | | | | |
|---|---|---|---|---|
| 10,940,078 B1 * | 3/2021 | Lee | ........................ | A61H 19/34 |
| 11,491,078 B1 * | 11/2022 | He | ........................ | A61H 7/005 |
| 11,771,619 B1 * | 10/2023 | Yan | ........................ | A61H 19/34 600/38 |
| 11,857,480 B1 * | 1/2024 | Wu | ........................ | A61H 19/40 |
| 12,257,171 B1 * | 3/2025 | Wu | ........................ | A61H 21/00 |
| 2017/0360653 A1 * | 12/2017 | Marshall | ................ | A61H 21/00 |
| 2021/0393475 A1 * | 12/2021 | He | ........................ | A61H 19/34 |

FOREIGN PATENT DOCUMENTS

| | | | | |
|---|---|---|---|---|
| DE | 4011536 C1 * | 10/1991 | ............... | A61F 5/41 |
| DE | 202024104033 U1 * | 9/2024 | ............. | A61H 19/34 |

* cited by examiner

*Primary Examiner* — Tu A Vo
*Assistant Examiner* — Kelsey E Baller

(57) ABSTRACT

A sexual stimulation device includes a main massage body and a flexible massage body. The main massage body has opposite first and second sides, the main massage body defines a through hole therein, and the through hole running through the main massage body from the first side to an second side. The flexible massage body is connected to the main massage body, and the flexible massage body is bendable and insertable through the through hole. A first vibration source is arranged in the main massage body, a second vibration source is arranged in the flexible massage body.

12 Claims, 5 Drawing Sheets

SEXUAL STIMULATION DEVICE

CROSS-REFERENCE TO RELATED APPLICATIONS

The present application claims priority of Chinese Patent Application No. 202422558681.5, filed on Oct. 22, 2024, the entire contents of which are hereby incorporated by reference.

TECHNICAL FIELD

The present disclosure relates to the technical field of sex toys, and in particular to a sexual stimulation device.

BACKGROUND

A sex toy is a kind of device to stimulate human organ such as the clitoris, the vagina of the woman, the rectum, and the prostate of the man. With the improvement of the human living, in addition to material aspects, more spiritual needs are being pursued. Sex has gained more and more attention as a spice of human life, and varied sex toys are developed to add pleasures to sexual intercourse, which satisfy human physiological and psychological needs to a certain extent.

However, a traditional sex toy has limitations in structural design, thus the sex toy has poor adaptability and is unable to satisfy user demand. Generally, a traditional sex toy is unable to deform according to different somatotypes and different demands of different human, because of poor flexibility in structure. Thus, a traditional sex toy cannot satisfy human with sexual stimulation demand.

SUMMARY

An object of this application is to provide a sexual stimulation device, which has flexible structure and good adaptability.

To achieve the above object, a sexual stimulation device is provided and includes:

- a main massage body having opposite first and second sides, the main massage body defining a through hole therein, and the through hole running through the main massage body from the first side to the second side; and
- a flexible massage body connected to the main massage body, the flexible massage body being bendable and insertable through the through hole;
- a first vibration source arranged in the main massage body; and
- a second vibration source arranged in the flexible massage body.

Compared with the prior art, the present application has the following beneficial effects: the sexual stimulation device effects based on mechanical vibration. The vibration sources vibrate and transmit the vibration to the main massage body and the flexible massage body. Each of the main massage body and the flexible massage body is connected to a vibration source, thus ensuring the vibration uniformly distributed to act on human body and the vibration act on a large area of human body. When the sexual stimulation device runs, the vibration generated by the vibration source is transmitted to the human body, such as the sexual organs (i.e. the clitoris, vagina or the prostate), so that the users are more likely to reach orgasm with the help of the present sexual stimulation device, resulting in better sexual life and better sexual experience. The design of the through hole and the flexible massage body being bendable to run through the through hole results in that the orientation and position of the sexual stimulation device is adjustable with the flexible massage body is bendable and deformable, so that the sexual stimulation device may act on different parts of human body, such as the vagina, the clitoris, the prostate and penis, and can be adapted to individuals of different bodily type, and thus is more compatible to satisfy human demands.

BRIEF DESCRIPTION OF DRAWINGS

In order to illustrate the technical solution in embodiments of the present application more clearly, the following briefly introduces accompanying drawings used in the description of the embodiments. Apparently, the accompanying drawings in the following description are only some embodiments of the present application. Those of ordinary skill in the art can obtain other accompanying drawings from these accompanying drawings without any creative efforts.

DESCRIPTION OF EMBODIMENTS

Figure 1:
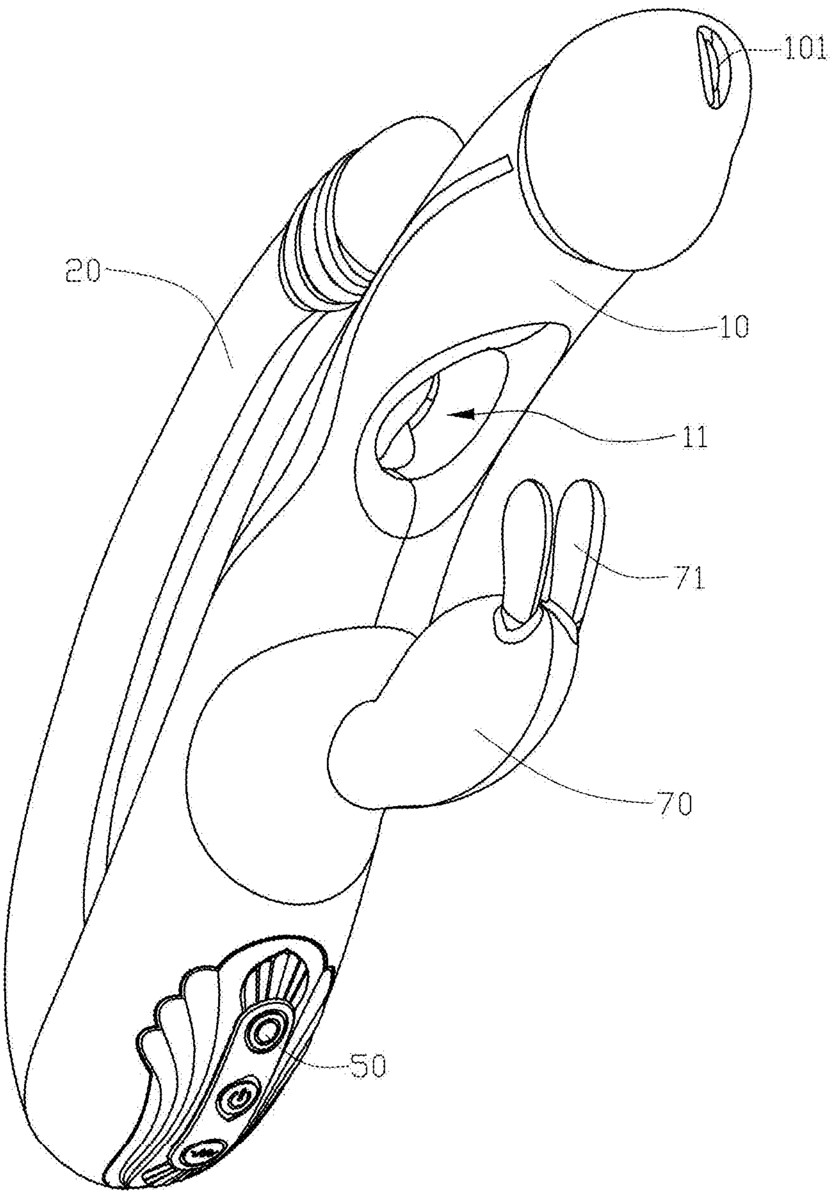
FIG. 1 is a schematic, assembled view of a sexual stimulation device according to an embodiment of the present application.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-4, a sexual stimulation device according to an embodiment of the present application is shown. The sexual stimulation device includes a main massage body 10, a flexible massage body 20 connected to the main massage body 10, a battery 30, a circuit board 40 and one or more buttons 50. The main massage body 10 has a free first end and a second end opposite to the first end, and a first vibration source is arranged in the free first end of the main massage body 10. The second end of the main massage body 10 is connected to the flexible massage body 20. The flexible massage body 20 has a free first end and a second end, the second end of the flexible massage body 20 is connected to the main massage body 10, and a second vibration source is arranged in the first end of the flexible massage body 20. The main massage body 10 has a first outer surface 102 and a second outer surface 103 opposite to the first outer surface 102. A through hole 11 is defined in the main massage body 10, and the through hole 11 runs through the main massage body 10 from the first outer surface 102 to the second outer surface 103 to communicate the first outer surface 102 with the second outer surface via the through hole 11. The first end of the flexible massage body 20 is bendable to pass through the through hole 11. The battery 30 is assembled in the main massage body 10, and supplies power to the vibration sources in the main massage body 10 and the flexible massage body 20. The circuit board 40 is arranged in the main massage body 10, and configured to control the operation of the sexual stimulation device 100 so as to turn on or turn off the vibration sources in the main massage body 10 and the flexible massage body 20. The buttons 50 are arranged on the main massage body 10, and contact with the circuit board 40. The circuit board 40 receives instructions from the buttons 50 to control the vibration sources in the main massage body 10 and the flexible massage body 20 to start or stop. Specifically, the first end of the flexible massage body 20 is connected to an exterior surface (i.e., an outer periphery) of the main massage body 10. The flexible massage body 20 is bendable and insertable through the through hole 11 from the first outer surface 102 and out of the second outer surface 103. As such, a portion of the flexible massage body 20 is at one side of the main massage body 10 and outside the through hole 11, and another portion of the flexible massage body 20 is at the other side of the main massage body 10 and outside the through hole 11.

The sexual stimulation device effects based on mechanical vibration. The vibration sources vibrate and transmit the vibration to the main massage body 10 and the flexible massage body 20. Each of the main massage body 10 and the flexible massage body 20 is connected to a vibration source, thus ensuring the vibration uniformly distributed to act on human body and the vibration act on a large area of human body. When the sexual stimulation device runs, the vibration generated by the vibration source is transmitted to the human body, such as the sexual organs (i.e. the clitoris, vagina or the prostate), so that the users are more likely to reach orgasm with the help of the present sexual stimulation device, resulting in better sexual life and better sexual experience. The design of the through hole 11 and the flexible massage body 20 being bendable to run through the through hole 11 results in that the orientation and position of the sexual stimulation device is adjusted with the flexible massage body 20 is bendable and deformable, so that the sexual stimulation device may act on several parts of human body, such as the vagina, the clitoris, the prostate and penis, and satisfy human demands.

Figure 2:
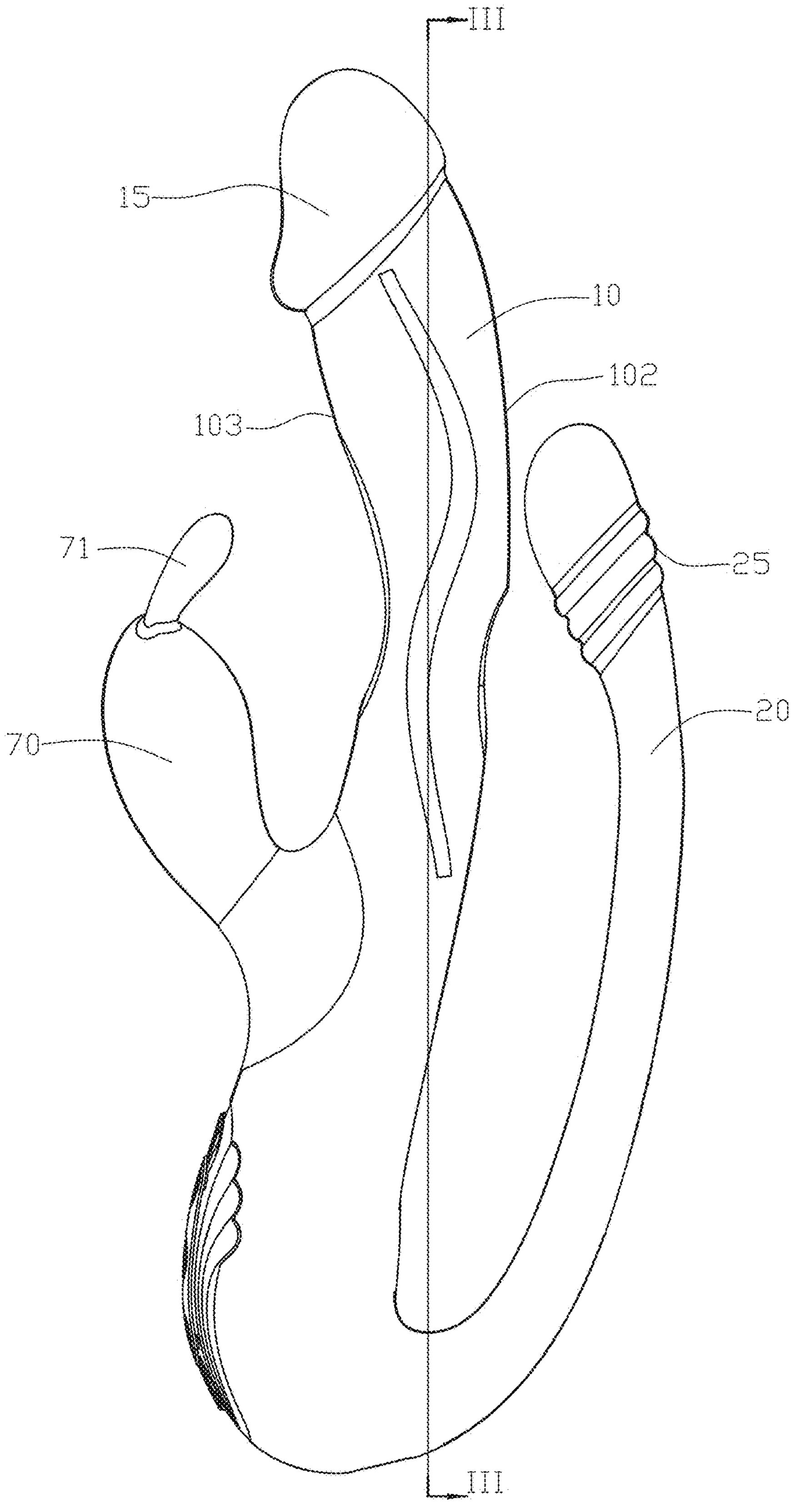
FIG. 2 is a front view of the sexual stimulation device of FIG. 1 in a first state.
Figure 5:
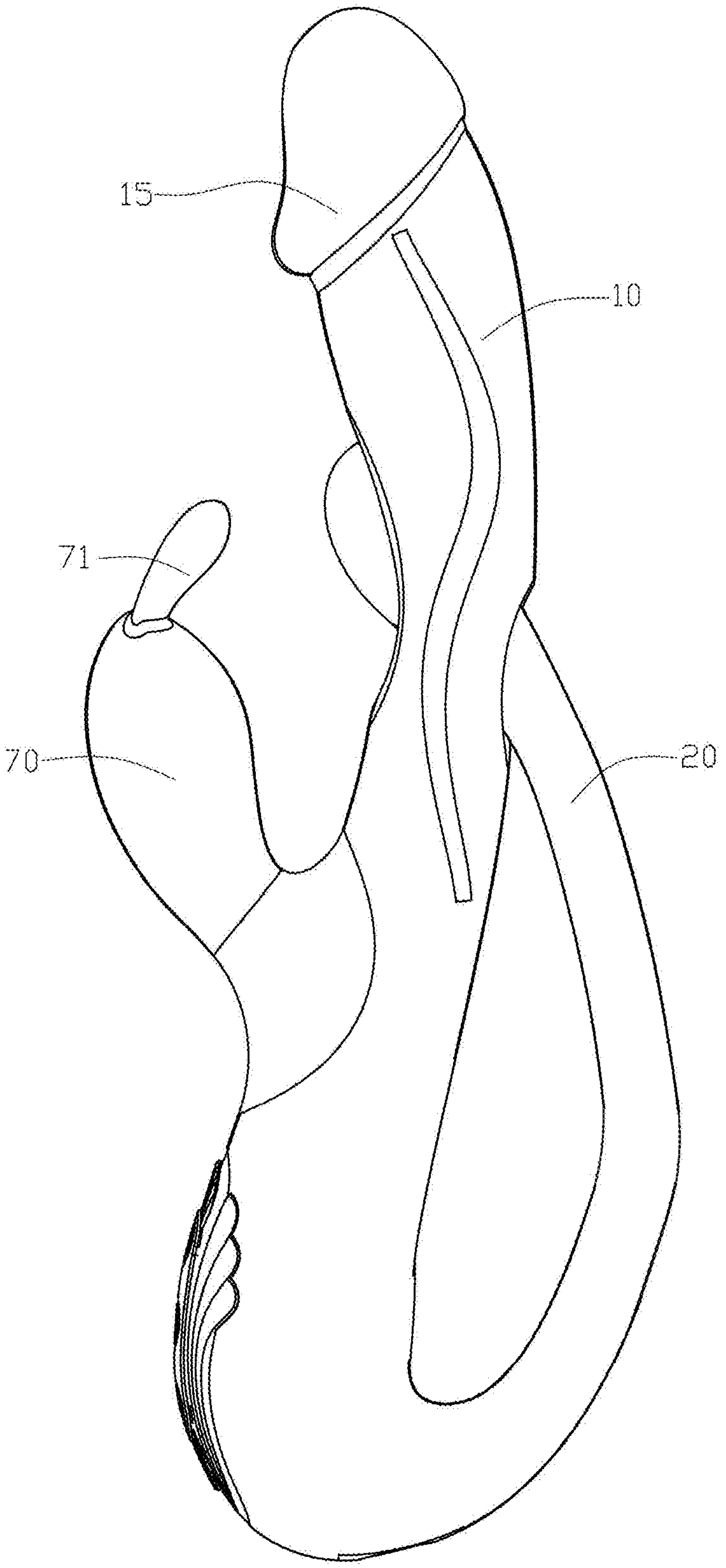
FIG. 5 is a front view of the sexual stimulation device of FIG. 1 in a second state.

In addition, the sexual stimulation device includes two modes. Referring to FIG. 2, the first mode is that the flexible massage body 20 is disengage from the through hole 11 and bent or straightened to massage human body to satisfy demand of the user. The main massage body 10 and the flexible massage body 20 may massage two parts apart with a long distance. For example, in the, during the main massage body 10 massages in the vagina, the flexible massage body 20 may massage clitoris or areas around the clitoris. Referring to FIG. 5, the second mode is that the flexible massage body 20 is engaged in the through hole 11, and a length of the portion of flexible massage body 20 passing through the through hole 11 may be adjusted to satisfy demand of the user. For example, in the second mode, the main massage body 10 is inserted in the vagina or the rectum of woman/man to massage, and the protruding second massage body 20 in the human organ prevents the sexual stimulation device from falling off during use and providing a good user experience. In this embodiment, the main massage body 10 includes a first part 105 and a second part 106, the through hole 11 is disposed between the first part 105 and the second part 106, and the first part 105 is closer to the second end than the second part 106. The first part 105 extends along a first direction L1. In the first mode, in the first direction L1, a length of the flexible massage body 20 is larger than a distance from the second end of the main massage body 10 to an end of the through hole 11 adjacent to the first end of the main massage body 10. The through hole 11 extends through the main massage body 10 along a second direction L2 that is inclined and intersects with the first direction L1. The through hole 11 has a first opening 111 and a second opening 112 disposed at two opposite ends of the through hole 11 to communicate with an outside environment of the main massage body 10.

In this embodiment, the through hole 11 is an inclined hole, and is inclinedly defined in the main massage body 10. Specifically, the main massage body 10 and the flexible massage body 20 may be firmly connected to each other because of the inclined through hole 11. The inclined through hole 11 allows the flexible massage body 20 being inserted into the through hole 11 with a certain angle, so that the sexual stimulation device perfectly matches with the human body to result a better sexual experience. The inclined through hole 11 means that the through hole 11 is not vertically arranged in the main massage body 10, but is slant relative to the main massage body 10, so that the flexible massage body 20 is tightly engaged in the through hole 11 of the main massage body 10 to prevent the flexible massage body 20 from moving relative to the main massage body 10. Therefore, when the sexual stimulation device works, the flexible massage body 20 may resist external force, such as the pressure performing on the flexible massage body 20 during massaging, so as to make the sexual stimulation device be stable.

The design of the inclined through hole makes the sexual stimulation device perfectly matches with the outline of organ, such as vagina, to result an efficient vibration transmission and a better sexual experience. The orientation and position of the flexible massage body 20 may be adjusted easily, so that the sexual stimulation device may be suitable for many different usage scenarios and satisfy many different human demands. Therefore, the flexibility and multi-functionality of the product are improved.

In this embodiment, the first side of the main massage body 10 faces the flexible massage body 20. The through hole 11 adjacent to the first side has a larger diameter than a diameter of the through hole 11 adjacent to the second side. The design of the through hole 11, result in that the flexible massage body 20 may be easily inserted in the through hole 11 and firmly mounted in the through hole 11 and the flexible massage body 20 has various of bending directions. The through hole 11 has a larger diameter at one side thereof, also result in that the flexible massage body 20 is tightly engaged in the through hole 11 of the main massage body 10 to prevent the flexible massage body 20 from sliding or moving relative to the main massage body 10. Thus, the stability of the sexual stimulation device is improved. The design of the inclined through hole makes the sexual stimulation device perfectly matches with the outline of organ, such as vagina, to result an efficient vibration transmission and a better sexual experience.

In this embodiment, a massage head with smooth curved surface is formed on an end of the main massage body 10 away from the flexible massage body 20, and a sectional area of the massage head gradually decreases along a direction from a bottom portion to a top end of the massage head. Specifically, a slot 101 is defined in a top end of the massage head. Specifically, the massage head has a shape like the glans of the penis.

Figure 3:
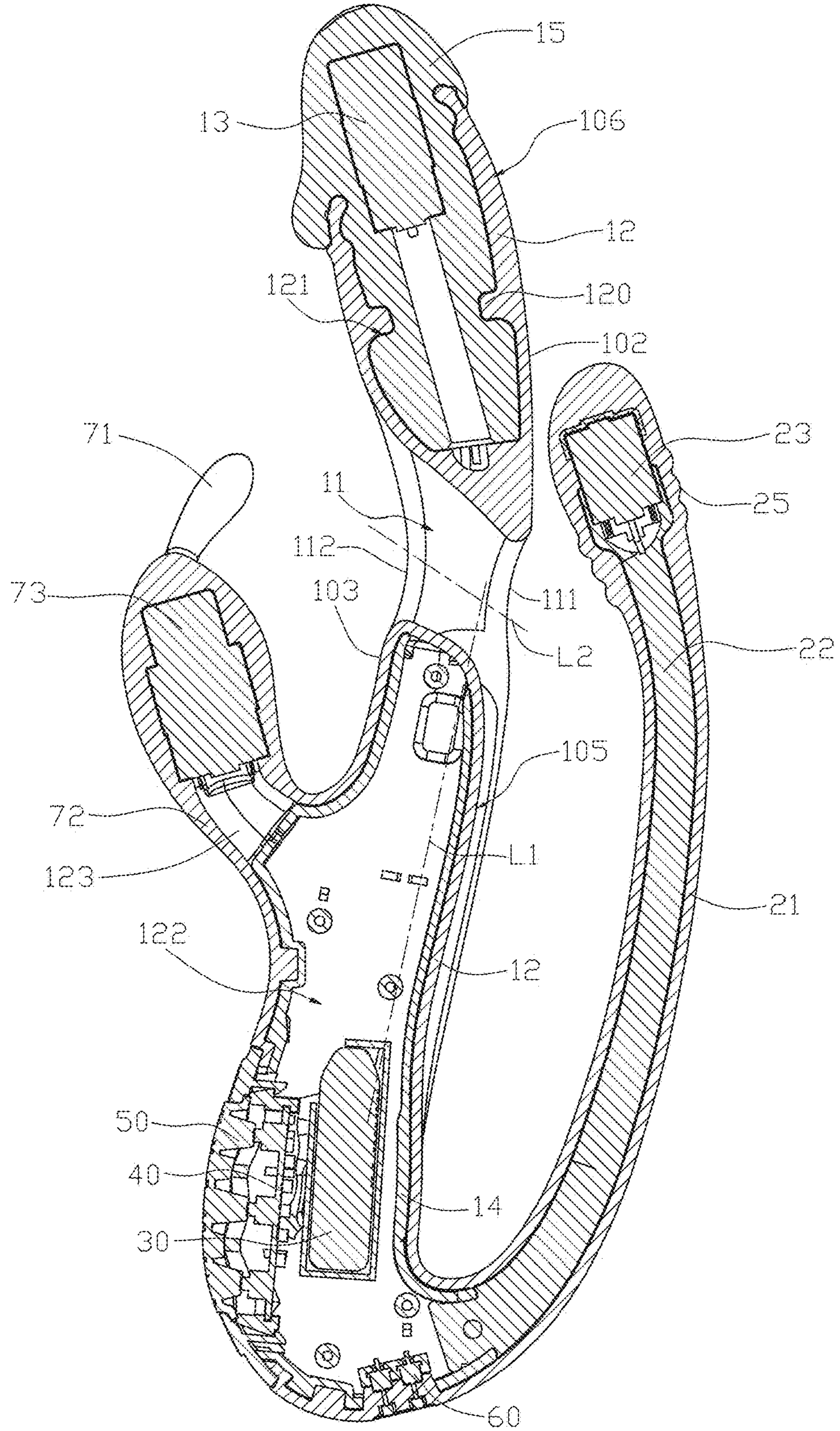
FIG. 3 is a cross sectional view of the sexual stimulation device of FIG. 1.
Figure 4:
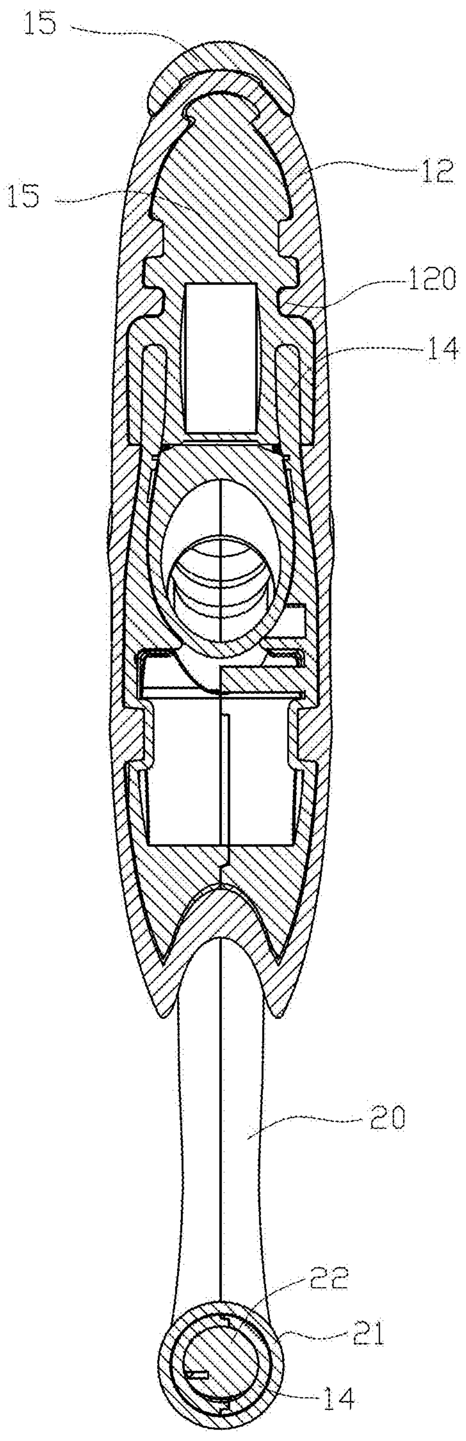
FIG. 4 is a further cross sectional view of the sexual stimulation device of FIG. 1, taken along line III-III of FIG. 2.

In this embodiment, referring to FIG. 3 and FIG. 4, the main massage body 10 includes a massage shell 12, a first vibration motor 13, a bracket 14 and a head portion 15. The first vibration source in the main massage body 10 includes the first vibration motor 13. The bracket 14 is coated in the massage shell 12, the head portion 15 is connected to an end of the massage shell 12 away from the flexible massage body 20, the first vibration motor 13 is arranged in the head portion 15, and the massage shell 12 and the bracket 14 are both connected to the flexible massage body 20. The massage head as above-described is formed on the head portion 15. Specifically, when the first vibration motor 13 runs, vibration is generated and the vibration is transmitted to the head portion 15 to act on human body, because the first vibration motor 13 is in the head portion 15. In this embodiment, the head portion 15 and the first vibration motor 13 may be connected together by injection molding, and also the head portion 15 and the first vibration motor 13 may be connected together by other connecting manners such as bolts or clips. The circuit board 40 is connected to the first vibration motor 13 by wires, and is configured to transmit control signal to control the motor to start and stop.

Specifically, the massage shell 12 and the head portion 15, serving as a functional part of the present sexual stimulation device that directly acts on the human body, is flexible and may be made of silicone, rubber, and etc. The massage shell 12 and the head portion 15 have a soft touch and can provide a certain buffering effect, thereby improving the comfort of use. It should be noted that the massage shell 12 and the head portion 15 may be made of other soft materials that can directly contact the human body, which is not limited by the present application.

Specifically, a block 120 is formed on an inside wall of the massage shell 12, a groove is defined in an outside wall of the head portion 15. A part of the head portion 15 is inserted into the massage shell 12, and the block 120 is engaged in the groove, so as to prevent the head portion 15 from falling off from the massage shell 12.

In this embodiment, a first mounting cavity 121 and a second mounting cavity 122 are defined in the massage shell 12, and the through hole 11 is positioned between the first mounting cavity 121 and the second mounting cavity 122. Part of the head portion 15 is received in the first mounting cavity 121. Specifically, the internal space of the main massage body 10 is divided into two portions: the first mounting cavity 121 and the second mounting cavity 122. Wherein, the first mounting cavity 121 and the second mounting cavity 122 are communicated. The first vibration motor 13 is arranged in the head portion 15 partially received in the first mounting cavity 121, and the battery 30 and the circuit board 40 are mounted in the second mounting cavity 122, thus efficiently insulating the vibration from the circuit board 40 and other modules to reduce interference of the vibration acting on the circuit board 40 and other modules. Therefore, the stability and durability of the sexual stimulation device are improved.

In this embodiment, the massage shell 12 is S-shaped. Therefore, the sexual stimulation device perfectly matches with the outline of the human organ, such as vagina and rectum of woman/man, to result a better sexual experience. The sexual stimulation device provides a good experience, because the sexual stimulation device has a shape naturally matches outline of human body. The design of S-shaped massage shell 12 makes the massage force uniform contributing on human body, thus avoiding discomfort by reason of a large force perform on a certain small portion of human body.

In this embodiment, the flexible massage body 20 includes a bendable flexible shell 21, a soft tube 22 and a second vibration motor 23. The second vibration source in the flexible massage body 20 includes the second vibration motor 23. The massage shell 12 of the main massage body 10 is connected to the flexible shell 21, the bracket 14 of the main massage body 10 is connected to the soft tube 22, and the soft tube 22 is engaged in the flexible shell 21. One end of the soft tube 22 is arranged adjacent to the main massage body 10, and the second vibration motor 23 is arranged on a free end of the soft tube 22. Specifically, the flexible shell 21 and the second mounting cavity 122 are communicated. The battery 30 supplies power to the circuit board 40, the circuit board 40 controls the first vibration motor 13 and the second vibration motor 23 to run to generate vibration that transmitted to human body by the main massage body 10 and the flexible massage body 20. The soft tube 22 enables the flexible massage body 20 to be bendable and movable, so as to fit different orientations and positions of massage demand. Specifically, the end of the soft tube 22 that arranged adjacent to the main massage body 10 is engaged in the bracket 14.

Specifically, at least one protrusion 25 is formed on the free end of the flexible massage body 20. When the flexible massage body 20 is inserted in the through hole 11, the protrusion 25 engages with an internal wall of the through hole 11 to make the flexible massage body 20 tightly engaged in the through hole 11 and prevent the flexible massage body 20 from falling off.

Specifically, the massage shell 12 of the main massage body 10 and the flexible shell 21 of the flexible massage body 20 are integrally formed. For example, the massage shell 12 and the flexible shell 21 are integrally formed by injection molding. It should be understood that the massage shell 12 and the flexible shell 21 may be connected by bolts and clips.

Specifically, the flexible shell 21, serving as a functional part of the present sexual stimulation device that directly acts on the human body, is flexible and may be made of silicone, rubber, and etc. The flexible shell 21 has a soft touch and can provide a certain buffering effect, thereby improving the comfort of use. It should be noted that the flexible shell 21 may be made of other soft materials that can directly contact the human body, which is not limited by the present application.

In this embodiment, a fixing member 60 is disposed between the massage shell 12 and the bracket 14, and the massage shell 12 and the bracket 14 are connected by the fixing member 60.

In this embodiment, the sexual stimulation device further includes a massaging portion 70, and the massaging portion 70 is disposed on the outside wall at the second side of the main massage body 10. The massaging portion 70 is inclined and faces the free end of the main massage body 10. The massaging portion 70 and the main massage body 10 may simultaneously massage two parts close to each other of human body to result a better sexual experience. For example, during the main massage body 10 massages in the vagina of woman, the massaging portion 70 may massage clitoris or areas around the clitoris of woman and the flexible massage body 20 may massage the penis of man. For another example, during the main massage body 10 massages in the rectum of man, the massaging portion 70 may massage the pennis of man and the flexible massage body 20 may massage the vagina or the clitoris of woman. Therefore, both of man and woman may have a better sexual experience. Of course, the main massage body 10, the flexible massage body 20 and the massaging portion 70 may massage any part of human body, and the sexual stimulation device may be used by a single man or a single woman.

Specifically, the massaging portion 70 includes an ear portion 71, a massaging portion shell 72 and a third vibration motor 73. The third vibration motor 73 is a vibration source in the massaging portion 70. Two ear portions 71 are formed on an end of the massaging portion 70 that facing the main massage body 10, such that the massaging portion 70 having a rabbit head like shape. The rabbit head shaped massaging portion 70 not only performs a massaging function, but also makes it funny during massaging. The third vibration motor 73 is disposed in a third mounting cavity 123 formed in the massaging portion shell 72.

Specifically, the massaging portion shell 72 of the massaging portion 70 and the massage shell 12 of the main massage body 10 are integrally formed. For example, the massage shell 12 and the massaging portion shell 72 are integrally formed by injection molding. It should be understood that the massage shell 12 and the massaging portion shell 72 may be connected by bolts and clips. The circuit board 40 controls the third vibration motor 73 starts to generate vibration, and the vibration is transmitted to human body by the massaging portion 70.

Specifically, the massaging portion shell 72, serving as a functional part of the present sexual stimulation device that directly acts on the human body, is flexible and may be made of silicone, rubber, and etc. The massaging portion shell 72 has a soft touch and can provide a certain buffering effect, thereby improving the comfort of use. It should be noted that the massaging portion shell 72 may be made of other soft materials that can directly contact the human body, which is not limited by the present application.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sexual stimulation device, comprising:

a main massage body defining a through hole therein, the through hole running through the main massage body, the through hole having a first opening and a second opening disposed at two opposite ends of the through hole to communicate with an outside environment of the main massage body; and a flexible massage body having a first end connected to an outer periphery of the main massage body and an opposite second end being bendable and insertable through the through hole;

wherein the flexible massage body has a first state in which the flexible massage body is entirely located outside the main massage body, and a second state in which the first end is located outside the main massage body and the second end is inserted through the through hole; and wherein when the flexible massage body inserts through the through hole, the second end of the flexible massage body is inserted into the through hole from outside via the first opening and extends out of the through hole via the second opening; the main massage body has a free first end and a second end opposite to the free first end, the through hole is defined between the free first end and the second end of the main massage body; the first end of the flexible massage body is connected to the second end of the main massage body; the flexible massage body comprises a bendable flexible shell and a soft tube, the soft tube is coated by the flexible shell, the soft tube extends from the first end of the flexible massage body to the second end of the flexible massage body; the main massage body comprises a massage shell, a bracket and a head portion, the bracket is coated by the massage shell, the massage shell of the main massage body is connected to the flexible shell, the head portion is connected to an end of the massage shell away from the flexible massage body, an end of the soft tube adjacent to the second end of the flexible massage body is connected to the bracket of the main massage body.

2. The sexual stimulation device of claim 1, wherein when the flexible massage body is in the second state, the flexible massage body and the main massage body are disposed to cross each other along their longitudinal axes so as to be jointly insertable into an internal cavity of human body.

3. The sexual stimulation device of claim 1, wherein a fixing member is disposed between the massage shell and the bracket, and the massage shell and the bracket are connected by the fixing member; the massage shell of the main massage body and the flexible shell of the flexible massage body are integrally formed.

4. The sexual stimulation device of claim 1, wherein the main massage body comprises a first part and a second part, the through hole is disposed between the first part and the second part, the first part is closer to the second end of the main massage body than the second part, the first part extends along a first direction; when the flexible massage body is in the first state, in the first direction, a length of the flexible massage body is larger than a distance from the second end of the main massage body to an end of the through hole adjacent to the first end of the main massage body.

5. The sexual stimulation device of claim 4, wherein the through hole extends through the main massage body along a second direction that is inclined and intersects with the first direction.

6. The sexual stimulation device of claim 1, wherein a first vibration source is arranged in the free first end of the main massage body; and a second vibration source is arranged in the second end of the flexible massage body.

7. The sexual stimulation device of claim 1, wherein when the flexible massage body is in the first state, the main massage body and the flexible massage body extend along different directions; when the flexible massage body is in the second state, the main massage body and the flexible massage body extend along different directions.

8. The sexual stimulation device of claim 1, wherein the sexual stimulation device comprises a first mode and a second mode, in the first mode, the flexible massage body is in the first state, the main massage body performs the massage independent from the flexible massage body; in the second mode, the flexible massage body is in the second state, the main massage body and the flexible massage body perform the massage together.

9. The sexual stimulation device of claim 1, wherein further comprises a massaging portion, the flexible massage body and the massaging portion are arranged on two opposite sides of the main massage body; the through hole is provided at a position between a connection of the massaging portion and the main massage body and the first end of the main massage body.

10. The sexual stimulation device of claim 9, wherein the massaging portion comprises two ear portions, a massaging portion shell and a third vibration motor; the two ear portions are formed on an end of the massaging portion that faces the main massage body, such that the massaging portion has a rabbit head like shape; the third vibration motor is disposed in a third mounting cavity formed in the massaging portion shell.

11. The sexual stimulation device of claim 1, wherein the first opening has a diameter larger than a diameter of the second opening so as to make the flexible massage body easily inserted in the through hole and firmly mounted in the through hole.

12. The sexual stimulation device of claim 1, wherein at least one protrusion is formed on the second end of the flexible massage body, and the protrusion is configured to be engaged with an internal wall of the through hole to make the flexible massage body tightly engaged in the through hole and prevent the flexible massage body from falling off.

* * * * *